May 28, 1968     G. B. KORTZ     3,385,183
KEYLOCK-TYPICAL SECTION
Filed Oct. 22, 1965
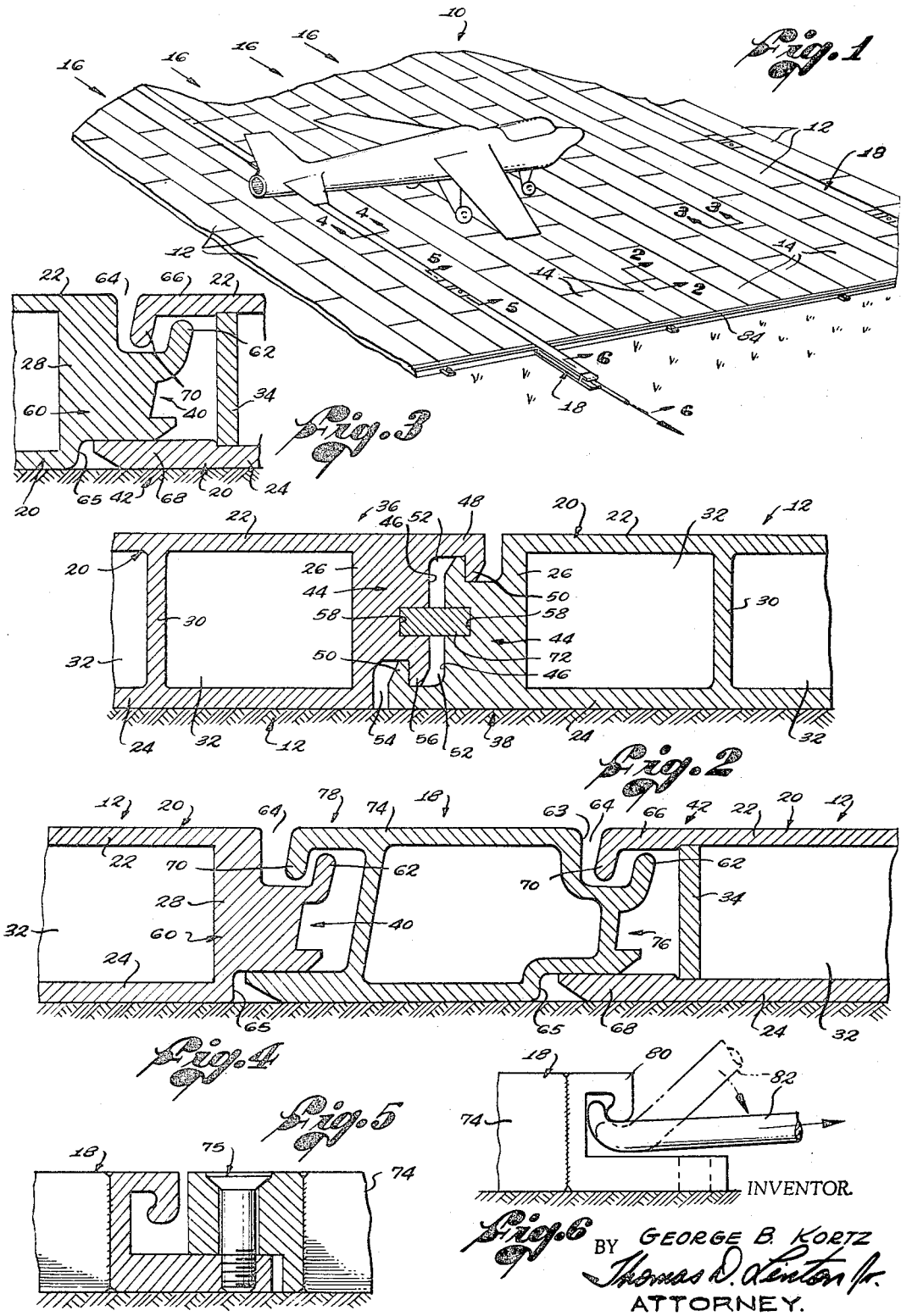
INVENTOR.
GEORGE B. KORTZ
BY Thomas D. Lenton Jr.
ATTORNEY.

United States Patent Office 3,385,183
Patented May 28, 1968

3,385,183
KEYLOCK-TYPICAL SECTION
George B. Kortz, Torrance, Calif., assignor to Harvey Aluminum, Torrance, Calif., a corporation of California
Filed Oct. 22, 1965, Ser. No. 502,668
3 Claims. (Cl. 94—13)

ABSTRACT OF THE DISCLOSURE

A modular load bearing platform including a plurality of rectangular load bearing plank interconnected in end-to-end relationship to form a plurality of parallel rows of load bearing planks with adjacent parallel rows being interconnectable with side connecting means. Removable coupling bar means are provided for interconnecting parallel rows of load bearing planks. The coupling bar means comprise a plurality of releasably interconnected elongated integral members which are slidably removable from the platform permitting disassembly of a portion of the load bearing platform and replacement of damaged load bearing plank(s) without disassembly and replacement of all load bearing planks from one end of the platform to the damage area. The members forming the coupling bar include ends bolted in overlapping relationship and fitting means for receiving tool means for effecting slidable removal and replacement of a coupling bar member.

---

This invention relates generally to load bearing platforms and has more particular reference to improvements in modular load bearing platforms composed of rectangular load bearing planks of the type disclosed in copending applications Ser. No. 296,555, filed July 22, 1963 and entitled Vehicle-Supporting Matting and Plank Therefor, now Patent No. 3,301,147, and Ser. No. 502,116, filed Oct. 22, 1965, and entitled Keylock Starter Section.

Each of the aforementioned copending applications discloses a modular load bearing platform composed of a number of similar load bearing modules which are commonly referred to as planks. Each plank has a cellular metal body of generally rectangular shape with a flat upper surface and a parallel lower surface. Along the side edges of each plank body are complementary shaped side connecting means which are adapted for releasable interlocking engagement with the side connecting means on other planks in the platform. Along the end edges of each plank body are complementary shaped end connecting means which are adapted for releasable interlocking engagement with the end connecting means on other planks in the platform. The several planks of the completed load bearing platform are arranged in a number of parallel rows each containing several planks disposed in end-to-end relation. The adjacent ends of the planks in each row are releasably joined by interlocking engagement of the end connecting means on the adjacent planks. The laterally adjacent planks in the adjacent plank rows are releasably joined in side-by-side relation by interlocking engagement of the side connecting means on the laterally adjacent planks. Preferably, the planks in adjacent rows are staggered, that is offset in the lengthwise direction of the rows, and the planks in alternate rows are aligned in a direction normal to the rows. In this case, so-called half-planks are installed at the ends of the plank rows to fill the gaps resulting from such a staggered pattern of the full length planks.

In the completed load bearing platform, the upper surfaces of the several planks are located substantially in a common plane so as to form an extended, relatively smooth load bearing surface. This completed platform may be used for various purposes, but is intended primarily for employment as an aircraft landing mat. In this application, the platform is designed for installation over uneven, relatively soft, or otherwise adverse terrain to serve as a temporary aircraft runway which may be disassembled for repair or transportation to a new location.

The existing modular load bearing platforms of the character described, while capable of adequately performing their intended functions, are deficient for the reason that removal of selected planks from the platforms for repair or replacement and subsequent reassembly of the platforms is difficult and time-consuming to accomplish. The reason for this is that the planks in the finished platform are interlocked in such a way that removal of a selected plank from any given plank row requires at least partial disassembly of all the preceding plank rows between the given row and one end of the platform. In some cases, it may be necessary to completely disassemble all of the preceding plank rows. Moreover, although the end connecting means on the adjacent planks in each plank row may be quickly and easily engaged when the planks are laid, the side connecting means on the planks comprise interlocking male and female shapes which can be rapidly engaged only in a way which requires the plank rows to be laid successively from one end of the platform, hereinafter referred to as the leading end, to the other end of the platform, hereinafter referred to as the trailing end. Accordingly, if the load bearing platform is to be reassembled in this most expeditious way following removal of a selected plank from a given plank row adjacent the leading end of the platform, such removal of the selected plank requires at least partial disassembly, and may require complete disassembly, of all of the plank rows between the given row and the trailing end of the platform. Thus, removal and replacement of a single damaged plank may require disassembly and subsequent reassembly of a major portion of the load bearing platform.

This deficiency of the existing modular load bearing platforms obviously detracts from their usefulness, regardless of the particular load bearing applications for which they are employed. The noted deficiency of the existing platforms is particularly serious, however, in certain applications, most notably those applications involving employment of the existing load-bearing platforms as aircraft landing mats or runways in military war zones. Thus, in these military applications, the platforms are subject to damage by bombing and other enemy military activities. Accordingly, it is essential that the platform be capable of rapid repair. This, in turn, requires the capability of removing and replacing one or more selected load bearing planks from any position in the load bearing platform, or landing mat, in minimum time and with minimum effort.

The present invention avoids the above discussed deficiency of the existing modular load bearing platforms by providing key locks or coupling bars which may be installed at intervals in the platform, between adjacent plank rows of the platform. Each such coupling bar has an exposed end along one side of the platform on which a force may be exerted to withdraw the bar endwise from the platform. Such withdrawal of a coupling bar releases the load bearing planks between the removed bar and an adjacent coupling bar for partial or complete disassembly without disturbing the remaining planks of the platform. Accordingly, removal and replacement of any selected load bearing plank in the platform requires only removal of the appropriate adjacent coupling bar and disassembly of as many of the adjacent planks as is required to remove and replace the selected plank. The improved modular load bearing platform of the invention, therefore, is capable of repair in much less time and with much less effort than existing platforms of this type, and is thus ideally suited for use as an aircraft landing mat or runway in military war zones. It is evident from the earlier discussion, however, that the present improved modular load bearing platform is not limited in usefulness to such military applications.

It is, therefore, a general object of the present invention to provide an improved modular load bearing platform of the character described.

Another object of the invention is to provide a modular load bearing platform which is uniquely constructed to permit removal and replacement of any one or more selected load bearing planks in the platform in minimum time and with minimum effort.

A related object of the invention is to provide a modular load bearing platform with spaced coupling bars which may be individually removed to release the adjacent load bearing planks in the platform for disassembly and reassembly without disturbing the remaining planks in the platform.

Another object of the invention is to provide a novel key lock or coupling bar for a modular load bearing platform of the character described.

Other objects, advantages, and features of the invention will become readily evident as the description proceeds.

With these and other objects in view, the invention consists in the construction, arrangement and combination of the various parts of the device, whereby the objects contemplated are attained, as hereinafter set forth, pointed out in the appended claims, and illustrated in the occompanying drawings:

In these drawings:

FIG. 1 is a perspective view of a modular load bearing platform according to the invention and illustrating one of the coupling bars being removed to release the adjacent load bearing planks for disassembly;

FIG. 2 is an enlarged section taken on line 2—2 in FIG. 1 and illustrating a pair of interlocked end connecting means on two adjacent load bearing planks;

FIG. 3 is an enlarged section taken on line 3—3 in FIG. 1;

FIG. 4 is an enlarged section taken on line 4—4 in FIG. 1;

FIG. 5 is an enlarged section taken on line 5—5 in FIG. 1; and

FIG. 6 is an enlarged section taken on line 6—6 in FIG. 1 and illustrating a pulling tool which is engaged with the coupling bar during removal of the bar from the platform.

In FIG. 1 of these drawings, there is illustrated an improved load bearing platform 10 according to the invention. Platform 10 includes a multiplicity of substantially identical, rectangular load bearing planks 12 and similar half planks 14. Planks 12 and 14 are arranged in a number of parallel rows 16 each containing several planks disposed in end-to-end relation. The planks in adjacent rows 16 are staggered, that is offset in the lengthwise direction of the rows. The planks in the alternate planks rows are aligned in a direction normal to the rows. The illustrated staggered pattern of the planks 12 results in the formation of gaps at the ends of the alternate plank rows along each side of the platform, which gaps are occupied by the half planks 14.

Installed at intervals in the load bearing platform 10, between adjacent plank rows 16 of the platform, are a number of key locks or coupling bars 18 which are constructed in accordance with the present invention. As hereinafter explained, each of these coupling bars is releasably joined to the planks 12 and 14 in the two plank rows adjacent the respective bar by interlocking side connecting means on the adjacent planks and bar. Similarly, the latterly adjacent planks in the adjacent plank rows between the coupling bars 18 are releasably joined in side-by-side relation by interlocking side connecting means on the planks. The planks in each plank row 16 are releasably joined in end-to-end relation by interlocking end connecting means on the planks.

Each load bearing plank 12 comprises a rectangular body 20 having upper and lower walls 22 and 24 integrally joined by edge walls 26 and 28 and intervening reinforcing ribs 30. Ribs 30 define therebetween cells 32 which reduce the overall weight of the plank. The particular plank illustrated is of the type disclosed in the aforementioned copending application Ser. No. 502,116. In this illustrated plank, the ribs 30 and cells 32 extend parallel to the end edges of the plank body 20, and the cells open through one side edge of the body. This open side of the body is closed by a fixed wall member 34. Copending applications Ser. No. 478,693, filed Aug. 10, 1965 and entitled Plank For Modular Load Bearing Surfaces Such As Aircraft Landing Mats, and Ser. No. 490,520, filed Sept. 27, 1965, and entitled Interlocking Device For Load Bearing Surfaces Such As Aircraft Landing Mats, disclose two alternate methods of fabricating a load bearing platform of this type. As will appear from the ensuing description, however, the present invention may be utilized, as well, in a load bearing platform composed of load bearing planks of the type disclosed in the aforementioned copending application Ser. No. 296,555 now Patent No. 3,301,147, wherein the reinforcing ribs and cells extend endwise rather than crosswise of the plank body.

Along the end edges of the plank body 20 are complementary shaped end connecting means 36 and 38, respectively. Along the side edges of the body are complementary shaped male and female side connecting means 40 and 42, respectively. The end connecting means 36 and 38 have identical stepped shapes but are rotated 180° with respect to one another. For convenience in the ensuing description, the end connecting means 36 on each load bearing plank will be referred to as an upper end connecting means and the end connecting means 38 on each plank will be referred to as a lower end connecting means.

The upper end connecting means 36 on each load bearing plank 12 comprises an integral stepped formation 44 on the outer side of one end edge wall 26 of the plank body 20. This stepped formation has an outwardly presented, vertical wall surface 46 disposed in a plane parallel to the ends of the plank body and normal to the upper and lower surfaces of the body. Extending outwardly from the upper edge of the wall surface 46, flush with the upper surface of the body 80, is a flange 48. Along the outer edge of the flange 48 is a depending tongue 50. Wall surface 46 and tongue 50 define therebetween a downwardly opening groove 52. Opening through the underside of the stepped formation 44 is a second groove 54. The outer wall of the latter groove and the wall surface 46 define therebetween a second depending tongue 56. Extending into the wall surface 46, in a plane disposed midway between and parallel to the upper and lower surfaces of the plank body 20, is a keyway 58. The lower edge of the tongue 50 is located above the level of the keyway 58. The lower edge of the tongue 56 is located above the level of the lower surface of the plank body. For convenience in the ensuing description, the tongues 50 and 56 will be referred to as outer and inner tongues, respectively, and the grooves 52 and 54 will be referred to as outer and inner grooves, respectively.

As noted earlier, the lower end connecting means 38 along the opposite end edge of the plank body 20 is identical in shape to the end connecting means 36, just described, but is rotated through 180° relative to the latter connecting means. Accordingly, the various elements of the end connecting means 38 are designated by the same numerals as the corresponding elements of the end connecting means 36.

The male side connecting means 40 on each load bearing plank 12 comprises a generally rib-like formation 60 on the outer side of the edge wall 28 of the plank body 20. Along the outer edge of this rib formation is an upstanding tongue 62, the upper edge of which is located a distance below the level of the upper surface of the plank body. The rib formation 60 has a vertical wall surface 63 located inwardly of the tongue 63 and defining with the tongue an upwardly opening groove 64. In the underside of the rib formation 60 is a relatively shallow recess 65 which opens downwardly and edgewise of the plank body.

The female side connecting means 42 along the opposite side edge of the plank body 20 comprises a pair of upper and lower flanges 66 and 68, respectively. These flanges extend edgewise from the body, substantially flush with the upper and lower surfaces, respectively, of the body. Along the outer edge of the upper flange 66 is a depending tongue 70.

The half planks 14 are identical to the full length planks 12 described above except that the length of the half planks is one-half the length of the full planks.

The end connecting means 36 and 38 are shaped to permit interlocking engagement of the upper end connecting means 36 on one plank with the lower end connecting means 38 on an adjacent plank. When a pair of end connecting means are thus interlocked, the outer and inner tongues 50 and 56 of each end connecting means engage in the inner and outer grooves 54 and 52, respectively, of the opposite end connecting means, as shown, so as to restrain the respective planks against edgewise separation. The keyways 58 of the interlocked end connecting means are aligned to slidably receive a key 72 which restrains the end connecting means against separation in a direction normal to the plane of the planks.

The male and female side connecting means 40 and 42 are shaped to permit interlocking engagement of the male side connecting means 40 on one plank with the female side connecting means 42 on an adjacent plank. When a pair of side connecting means are thus interlocked, the male connecting means 40 is disposed between the upper and lower flanges 66 and 68 of the female connecting means, the tongue 70 on the female connecting means engages in the upper groove 64 of the male connecting means, and the lower flange 68 on the female connecting means seats edgewise in the lower recess 65 of the male connecting means, as shown.

Each coupling bar 18 of the present invention comprises a relatively long and narrow body 74 which may be hollow in transverse cross section, as shown. According to the preferred practice of the invention, the body 74 of each coupling bar is composed of a number of sections which are joined end-to-end by bolted couplings 75. In some cases, however, it may be desirable to construct the body 74 of each coupling bar in one continuous section. Along the opposite side edges of the body 74 of each coupling bar are side connecting means 76 and 78, respectively. The side connecting means 76 on each coupling bar is identical in shape to the male side connecting means 40 on the load bearing planks 12 and 14. Accordingly, the various elements of the side connecting means 76 on each coupling bar are designated by the same reference numerals as the corresponding elements of the male side connecting means 40 on the load bearing planks. Similarly, the side connecting means 78 on each coupling bar 18 is identical in shape to the female side connecting means 42 on the load bearing planks 12 and 14. Accordingly, the various elements of the side connecting means 78 on each coupling bar are designated by the same reference numerals as the corresponding elements of the female side connecting means 42 on the load bearing planks. It is evident that each section of the coupling bars 18 may be conveniently fabricated by a simple extrusion process.

In the completed load bearing platform 10, the load bearing planks 12 and 14 in each of the plank rows 16 are releasably joined in end-to-end relation by interlocking engagement of the end connecting means 36 and 38 on the adjacent planks in the respective row. The adjacent plank rows are releasably joined by interlocking engagement of the male and female side connecting means 40 and 42 on the latterly adjacent planks in the respective adjacent rows. Each coupling bar 18 is releasably joined to the two plank rows 16 adjacent the respective bar by interlocking engagement of the male side connecting means 76 on the respective bar with the female side connecting means 42 on the planks in one adjacent plank row and interlocking engagement of the female side connecting means 78 on the respective coupling bar with the male side connecting means 40 on the planks of the other adjacent plank row.

It is evident from the earlier description that the end connecting means 36 and 38 present no deterrent to rapid assembly of the load bearing planks 12 and 14 to form the completed load bearing platform 10. Thus, when assembling the platform, the planks 12 and 14 in each plank row 16 may be laid, starting at the end of the row adjacent the upper end connecting means 36 on the planks in the row. Each successive plank in the row may then be joined to the preceding plank by simply lowering each successive plank to the ground in such a way that the downwardly facing, upper end connecting means 36 on each successive plank is lowered into mating engagement with the upwardly facing, lower end connecting means 38 on the preceding plank. Thereafter, the adjacent planks are interlocked by inserting the keys 72 into the aligned keyways 58 of the respective interengaging end connecting means.

Interengagement of the male and female side connecting means 40 and 42 on the laterally adjacent planks in the adjacent plank row 16, however, is more difficult to accomplish. Thus, when engaging the side connecting means on two laterally adjacent planks, it is necessary to first rotate one of the planks upwardly to an elevated position, wherein the included angle between the upper surfaces of the planks is substantially less than 180°. Thereafter, the planks are relatively moved toward one another to a position wherein the male connecting means 40 on one plank is disposed between the flanges 66 and 68 of the female connecting means 42 on the other plank. The assembly procedure is then completed by lowering the elevated plank to the ground in such a way that the male and female connecting means assume the interlocked position described and illustrated in the drawings. This method of assembly of two laterally adjacent planks may be accomplished, obviously, by rotatably elevating either plank. It has been found in practice, however, that the assembly can be most quickly and easily effected by elevating the plank having the female connecting means 42 which is to be engaged with the male connecting means 40 on the laterally adjacent plank.

The existing modular load bearing platforms disclosed in the aforementioned copending applications are similar to the present improved load bearing platform and differ from the latter platform only in the omission of the coupling bars 18. It is evident at this point that these existing modular load bearing platforms are capable of adequately performing their intended functions so long as it remains unnecessary to remove one or more of the load bearing planks 12 or 14 from the platform for repair or replacement. It is further evident that such removal and replacement of a selected plank or planks from the existing load bearing platforms is difficult and time-consuming to accomplish, particularly if the platform is required to be subsequently reassembled in the most expeditious manner, just mentioned. Thus, assume that it became necessary to replace a selected plank 12 located in a given plank row near the center of the platform. In this case, removal and replacement of the selected planks would require at least partial disassembly of all of the plank rows between the given row and one end of the platform. In some cases, it might be necessary to completely disassemble the several intervening plank rows. Moreover, if, after replacement of the selected plank, the platform were required to be reassembled in the aforementioned, most expeditious manner, the time and effort required to remove and replace the selected plank and reassemble the platform would be substantially increased to such an extent that the platform might be totally unacceptable for many applications, such as the military applications referred to earlier. Assume, for example, that it became necessary to replace a selected plank 12 in a given plank row situated near the leading end of the platform, that is the end of the platform containing the first assembled plank row. In this case, removal and replacement of the selected plank would require partial, and in some cases, complete disassembly of all of the intervening plank rows between the given row and the opposite, trailing end of the platform. Accordingly, replacement of a single damaged plank in the platform might require disassembly and subsequent reassembly of a major portion of the platform.

The present invention avoids this deficiency of the existing modular load bearing platforms. Thus, according to the present invention, the coupling bars 18 are so constructed and arranged that each bar may be withdrawn endwise from the completed load bearing platform 10. It is evident that such withdrawal of one of the coupling bars 18 releases the load bearing planks 12 and 14 between the withdrawn bar and the adjacent coupling bars for disassembly and subsequent reassembly without disturbing the remaining load bearing planks of the platform. Preferably, each of the coupling bars 18 is removed to release, for disassembly and subsequent reassembly, only those load bearing planks 12 and 14 situated at the side of the bar adjacent the female side connecting means 78 on the bar. The reason for this is to permit the planks to be reassembled in the most expeditious manner referred to earlier. Thus, it is evident that if load bearing planks situated at both sides of a coupling bar 18 were disassembled, after removal of the bar from the platform 10, the planks at the side of the bar adjacent the female side connecting means on the bar may be rapidly reassembled in the manner explained earlier, that is by rotatably elevating the planks in each successive plank row, engaging the female side connecting means 42 on the elevated planks with the male side connecting means 40 on the planks in the preceding plank row, and then lowering the elevated planks to the ground. The load bearing planks at the opposite side of the removed coupling bar 18, on the other hand, would be required to be reassembled by the more difficult and time-consuming method of elevating the planks in each successive plank row, engaging the male side connecting means 40 on the elevated planks with the female side connecting means 42 on the planks in the preceding plank row, and then lowering the elevated planks to the ground. As noted earlier, it has been found in practice that this latter method of assembling the load bearing planks 12 and 14 require substantially greater time and effort to accomplish.

In order to permit endwise withdrawal of the coupling bars 18 from the load bearing platform 10, one end of each bar is exposed along one side of the platform and is equipped with a generally hook-shaped fitting 80 which may be engaged by a hook-shaped tool 82 in the manner illustrated in the drawings. This tool may be attached by a cable or other means (not shown) to a suitable device for exerting a pulling force on the engaged coupling bar 18 for withdrawing the latter endwise from the load bearing platform 10. The coupling bar is reinserted into the platform by sliding the bar endwise between its respective adjacent plank rows 16. In a typical load bearing plank according to the invention, the adjacent coupling bars 18 are located on the order of 100 feet apart.

The edges of the platform are anchored to the ground in any suitable way, as by anchor bars 84 of the type disclosed in the aforementioned copending application, Ser. No. 296,555.

It is now evident that the invention herein described and illustrated is fully capable of attaining the several objects and advantages preliminarily set forth.

While a presently preferred embodiment of the invention has been disclosed for illustrative purposes, it will be evident to those skilled in the art that various modifications in the design, arrangement of parts, and instrumentalities of the invention are possible within the spirit and scope of the following claims.

I claim:

1. A modular load bearing platform comprising:

a multiplicity of similar rectangular load bearing planks arranged in a number of parallel rows each containing several planks disposed in end-to-end relation, each plank including first and second end connecting means along its end edges, respectively, and first and second side connecting means along its side edges, respectively, said first and second end connecting means having complementary shapes and being adapted for releasably interlocking engagement with the end connecting means on adjacent planks in said platform, the several planks in each plank row being releasably joined in end-to-end relation by interlocking engagement of said first end connecting means on each plank with said second end connecting means on an adjacent plank in the respective row, said first and second side connecting means having complementary shapes and being adapted for releasable interlocking engagement with the side connecting means on adjacent planks in said platform, removable coupling bar means comprising a plurality of elongated integral members located in end-to-end relationship between two adjacent plank rows of said platform, said removable coupling bar including side connecting means along side edges of the elongated integral members complementing and adapted for slidable interlocking engagement with the adjacent side connecting means on the planks in the respective adjacent plank rows, said planks and coupling bar having generally flat and coplanar upper surfaces defining an extended relatively smooth load bearing surface, said coupling bar and the two plank rows adjacent said bar being releasably joined in side-by-side relation by interlocking engagement of said side connecting means on said bar with the adjacent side connecting means on the planks in the respective two adjacent plank rows, said coupling bar being slidably removable in endwise direction from said platform to release the planks adjacent at least one side of said bar for disassembly without disturbing the remaining planks in said platform, and connection means on the elongated integral member forming said coupling bar for releasably interconnecting the elongated integral members for effecting slidable removal and reassembly of said bar in said platform.

2. A platform according to claim 1 wherein:

said connection means for the coupling bar members include overlapping end portions adapted to be releasably bolted together for interconnecting and disconnecting said coupling bar members during slidable removal and reassembly of the coupling bar.

3. A platform according to claim 1 wherein:

one end of said coupling bar is exposed at one side of said platform, and said connector means for effecting removal and reassembly of said coupling bar comprises fitting means on said one end of said coupling bar adapted for engagement with tool means for slidable endwise removal and assembly of said coupling bar with respect to said platform.

References Cited

UNITED STATES PATENTS 3,175,476   3/1965   Franks _____ 94—13
3,301,147   1/1967   Clayton et al. _____ 94—13

JACOB L. NACKENOFF, *Primary Examiner.*